United States Patent [19]
Clement

[11] Patent Number: 5,314,220
[45] Date of Patent: May 24, 1994

[54] LIFTING TOOL FOR DUTCH OVEN COVERS

[76] Inventor: Roger B. Clement, 175 E. Center St., Spanish Fork, Utah 84660

[21] Appl. No.: 132,253

[22] Filed: Oct. 6, 1993

[51] Int. Cl.$^5$ .............................................. A47J 45/10
[52] U.S. Cl. ........................................ 294/10; 294/13; 294/24
[58] Field of Search .................. 294/2, 9-15, 294/17-19.1, 24, 26, 27.1, 28, 31.1; 16/114 R, 114 A, 124

[56] References Cited

U.S. PATENT DOCUMENTS

| | | | |
|---|---|---|---|
| 167,219 | 8/1875 | Carpenter | 294/2 |
| 783,314 | 2/1905 | Rockelein | 294/13 |
| 933,963 | 9/1909 | Edwards | 294/27.1 X |
| 1,083,808 | 1/1914 | Dunson | 294/27.1 |
| 1,168,329 | 1/1916 | Raczkowski | 294/13 |
| 1,178,425 | 4/1916 | Tant | 294/13 X |
| 1,205,222 | 11/1916 | Knisley | 294/13 |
| 1,217,010 | 2/1917 | Kennedy | 294/2 |
| 4,222,599 | 9/1980 | Gale et al. | 294/12 |
| 4,227,731 | 10/1980 | Castle | 294/17 |
| 4,903,683 | 2/1990 | Larsen et al. | 294/12 X |

Primary Examiner—Johnny D. Cherry
Attorney, Agent, or Firm—Delbert R. Phillips

[57] ABSTRACT

A tool for lifting hot or unaccessible lids or covers with handles is described. The apparatus consists of a handle with a hook that pivots and a stabilizing member. The hook attached to the pivot also can have a stabilizing member attached thereto. The hook and stabilizing member provide a snug contact with the lid when lifting the lid vertically without deviation from the horizontal plane. A hook proximal or attached to the stabilizing member can engage the handle of the lid while the stabilizing member attached to the pivotal member snugly contacts the lid providing a method of lifting the lid so that it deviates from the horizontal plane without loosing stability.

9 Claims, 3 Drawing Sheets

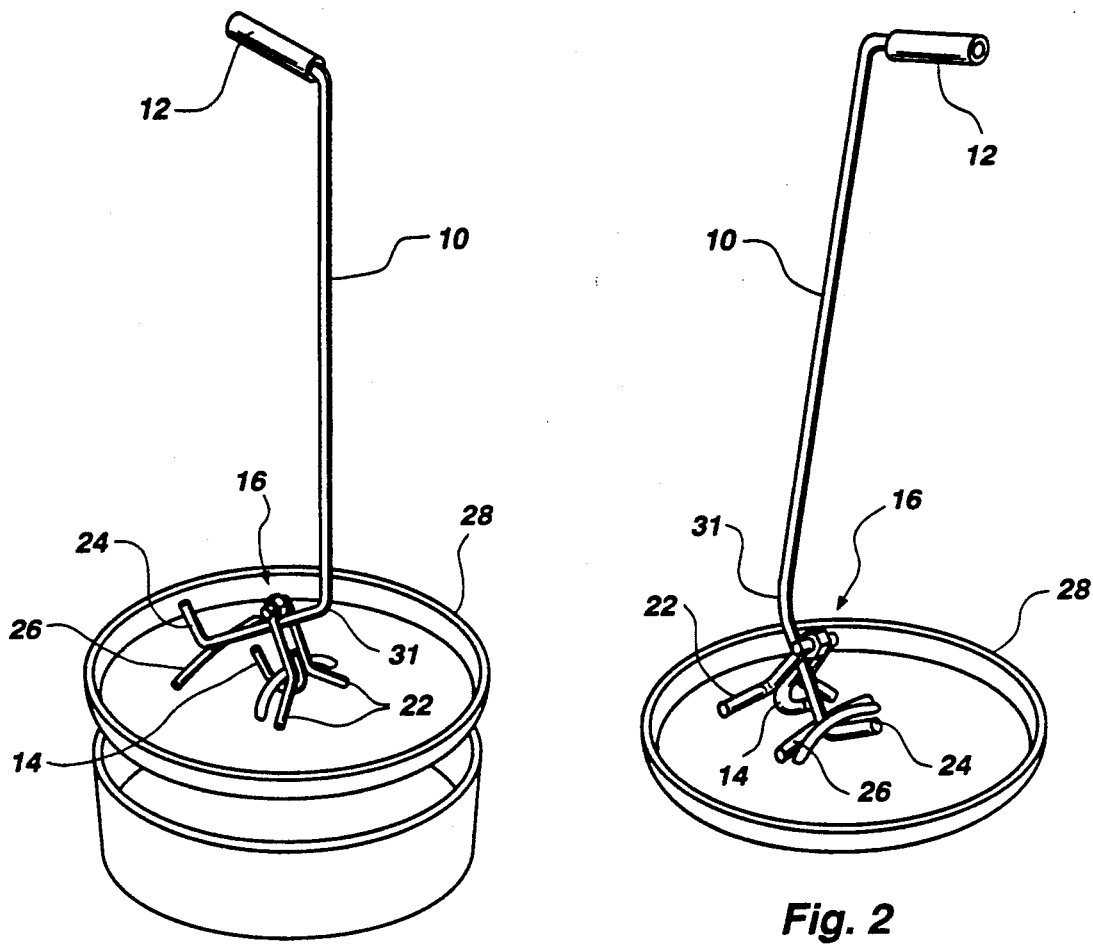
Fig. 1
Fig. 2
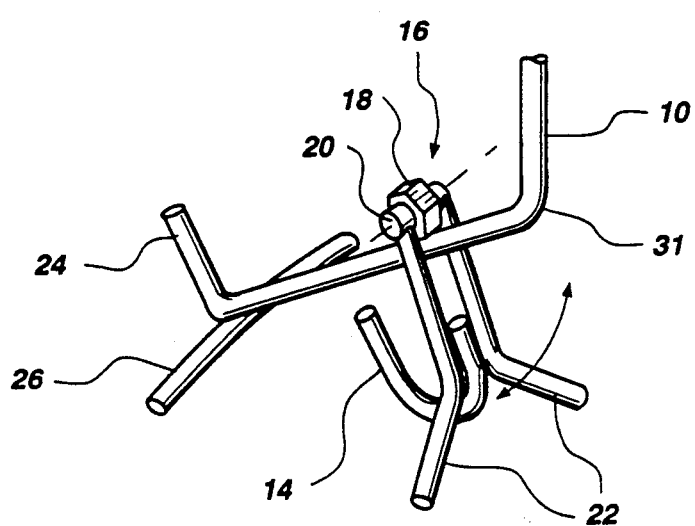
Fig. 3

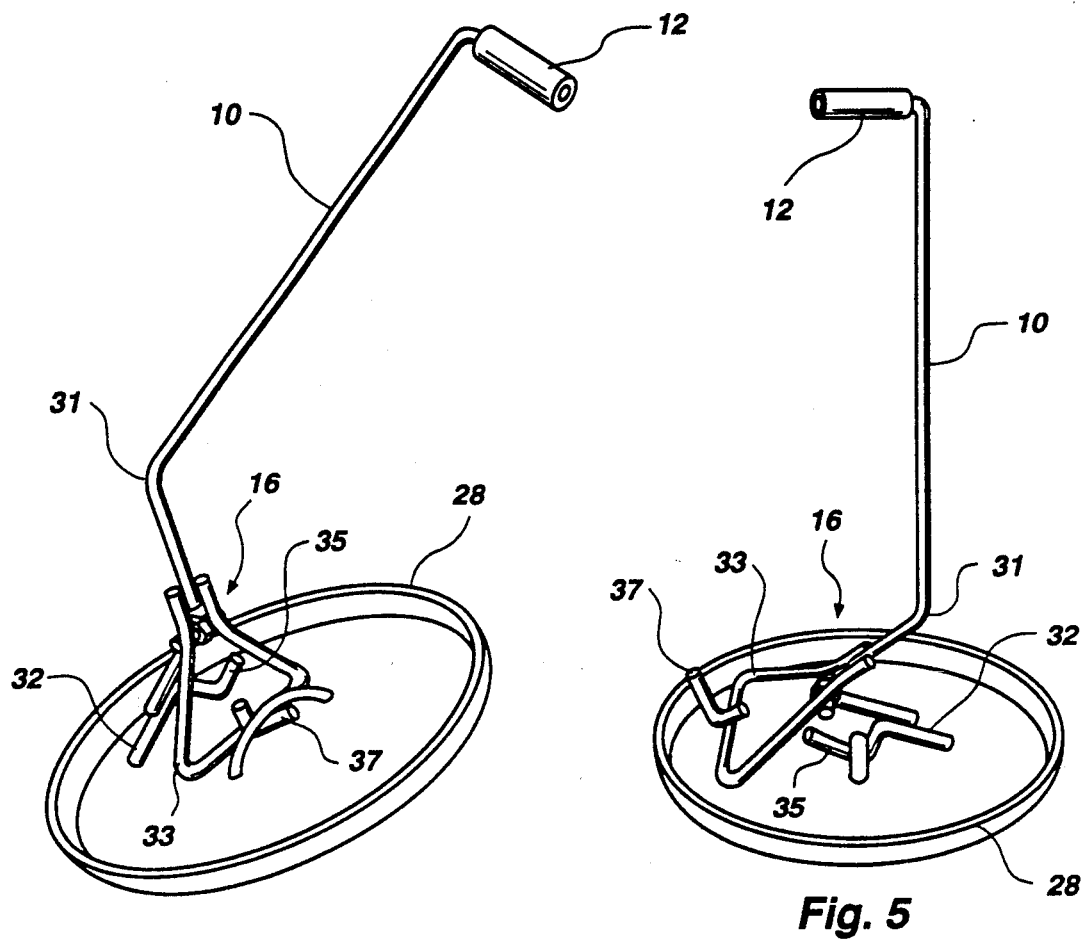
Fig. 4
Fig. 5
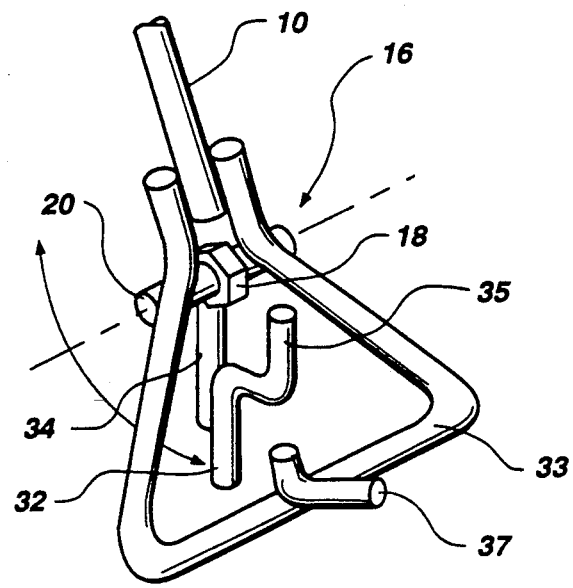
Fig. 6

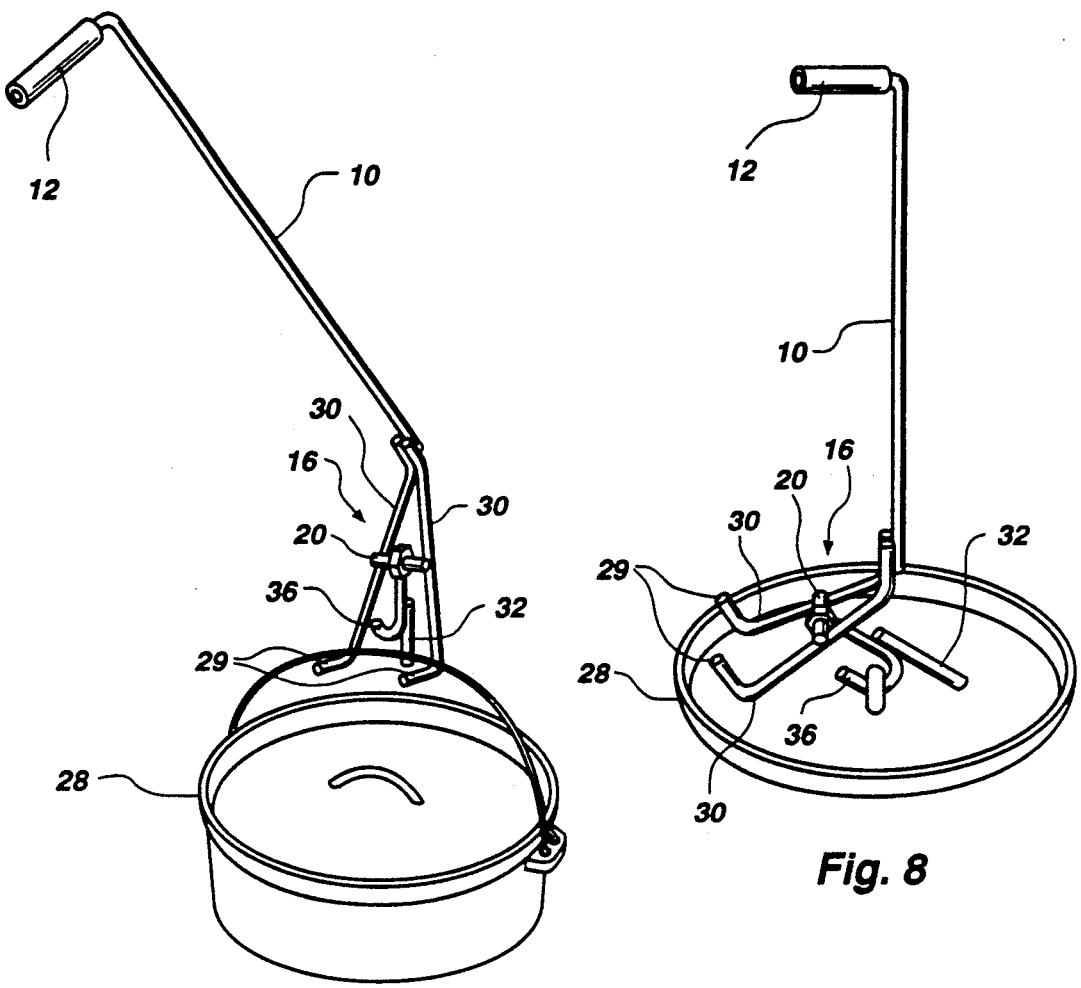
Fig. 7
Fig. 8
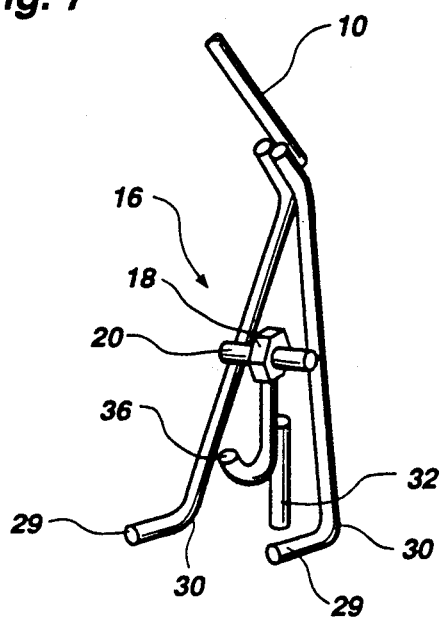
Fig. 9

LIFTING TOOL FOR DUTCH OVEN COVERS

FIELD OF INVENTION

This invention relates generally to devices designed for grasping, removing and lifting tops, lids or covers from apertures such as ends of pipes, pots, manholes, and other containers. In particular, this invention relates to a device for grasping, stabilizing, and removing cumbersome covers and lids that may be hot such as those used on a Dutch oven.

BACKGROUND OF THE INVENTION

When cooking with a Dutch oven or other cooking container that requires fuel to cover the lid, it is frequently necessary to remove the lid to monitor the cooking process without allowing the coals and ash to spill onto the cooking contents in the container.

Previous to this invention, many devices such as pliers, the claw of a hammer, garden implements, such as hoes, pitch forks, shovels, or their handles have been used to position and lift tops and lids from Dutch ovens. There have also been other devices developed for lifting lids off of pots which usually consist of a hook or other means for engaging the lid handle prior to removal. Specific tools for removing the lids of Dutch ovens include hooking devices and gripping devices. Some of these devices have extended handles which distance the user from the heating material on the lid. However, no device provides an adequate solution for stabilizing the lid while it is being removed from the pot. Some tools for lifting lids have utilized an added member, such as a peg, in proximity to the hook or grasping means, as an additional point of contact in order to stabilize the lid or cover as it is being lifted. These tools fail to limit the rotary lateral movement of the lid when it is raised, thereby allowing ashes to contaminate the food.

U.S. Pat. Nos. 5,071,182 and 5,183,304 describe a device for lifting Dutch oven lids which includes two elongated rods conjoined together, one rod being slidably adjustable in relation to the other. Both rods have handles for grasping by the user. The handles are attached or formed at the upper end of the rods. One rod has a stabilizing means formed at the lower end of the rod, opposite the handle, which contacts the lid of the Dutch oven during the removal process. The other rod has an arcuately shaped hook for engaging the handle of the lid, formed at the end of the rod opposite to the grasping means. The two rods are connected by means that permit the second rod to slide relative to the first thereby allowing the grasping means to engage the handle of the lid while the stabilizing means on the first rod is held in contact with the lid. This particular device requires a gripping motion and flexion of the user's wrist which makes it difficult to lift the lid without deviating from the horizontal plane. This often results in the material on the lid being spilled into the contents of the Dutch oven.

SUMMARY OF THE INVENTION

This invention is a simple device that will snugly grasp lids on heated or difficult to access apertures allowing the lid to be lifted vertically without deviation from the horizontal plane. Another aspect of this invention is to provide a tool with the ability to engage the handle of the lid in such a way that the lid may be lifted off at an angle from the horizontal plane with total control of the lid and any ash o the lid.

This invention pertains to a lifting device for lifting and manipulating covers with handles which comprises a first rod with a proximal end and a distal end. This said first rod has a handle. The first rod also has lid engaging first stabilizing means formed on said distal end. A pivot means is formed on said first rod adjacent to said distal end. A second rod means has a proximal end and a distal end. This second rod means proximal end is pivotally attached to said first rod means by said first rod pivot means. The second rod means has a lid engaging means on said second rod distal end. A hook means is associated with said first rod distal end for engaging said lid handle or a hook means is formed as part of the first rod distal end. A hook may also be formed as part of the second rod distal end. Said first rod distal end can also have a first section bent outwardly to form an angle between with said rod and a second section bent upwardly to form said hook. The first rod distal end stabilizing means can be a lateral member extending outwardly in either direction from said first rod at essentially right angles at said first rod second section bend. Said second rod is formed by parallel sides joined at said second rod proximal end by a shaft. The second rod shaft is rotatable in said first rod pivot means. The second rod parallel sides are bent outwardly and away from each other at said second rod distal end. The hook means is associated with said first rod distal end and is securely attached between said second rod parallel sides.

Another aspect of the invention has a lid engaging first stabilizing means formed on the distal end of the first rod. The first rod distal end is formed as a closed structure essentially in the shape of a triangle with the base of the triangle forming said first stabilizing means. A hook means is solidly attached to the closed structure midway between the points of attachment to the first rod. A second rod means extends between the said upper sides of said triangle. The second rod means has a pivot means midway between it ends. The lifting tool has a third rod means having a proximal end and a distal end. This third rod means proximal end is pivotally attached to said second rod means by said second rod pivot means. The third rod means also has a lid engaging means on said third rod distal end. The third rod means also has a hook means attached midway between the ends of the third rod means.

A further aspect of the invention has the distal end of said first rod formed into a vee by two sections that extend outwardly. The distal ends of said two sections extending outwardly are bent upwardly to form hook means and two stabilizing lid engaging points. The said two sections extend at an angle to the major extent to said first rod means. A connecting rod extends between the proximal ends of said two sections extending at an angle. A pivot means is rotatably secured to said connecting rod. A second rod means is secured to said pivot means. The said second rod distal end is bent into the shape of a hook. A stabilizing peg is secured to said second rod near said bend forming said second rod into the shape of a hook.

A BRIEF DESCRIPTION OF THE DRAWINGS

FIG. 1 is a perspective view of the lifting apparatus with lateral stabilizing means attached to the main rod. The lifting apparatus is positioned to lift the lid of a Dutch oven vertically while maintaining it in horizontal plane.

FIG. 2 is a perspective view of the lifting apparatus with stabilizing means attached to the main rod. The lifting apparatus is positioned to lift the lid of a Dutch oven at an angle from the horizontal plane.

FIG. 3 is a perspective view of the pivotal hook with lateral stabilizing extensions, and a fixed hook with lateral stabilizing extensions.

FIG. 4 is a perspective view of the alternate lifting apparatus wherein the stabilizing member is a closed structure with a hook, attached midway between the points of contact on the main lifting rod. The lifting apparatus is positioned to lift the lid at a angle from the horizontal plane.

FIG. 5 is a perspective view of the alternate lifting apparatus wherein the stabilizing member is a closed structure with a hook attached midway between the points of contact on the main lifting rod. The lifting apparatus is positioned to lift the lid vertically while maintaining it in a horizontal plane.

FIG. 6 is a perspective view of the closed stabilizing means with a hook attached midway between the points of contact on the main rod and a pivotal hook with a stabilizing member attached thereto.

FIG. 7 is a perspective view that depicts the lifting apparatus wherein the stabilizing means attached to the main rod has members that form a vee shape. The apparatus is positioned to engage the bail of a Dutch oven.

FIG. 8 is a perspective view which depicts the lifting apparatus wherein the stabilizing means attached to the main rod has members that form a vee shape. The pivotal hook is engaging the handle of the Dutch oven lid.

FIG. 9 is a perspective view of the vee shaped stabilizing means with the hook attached to a pivot on the connecting rod between the members forming a vee.

DETAILED DESCRIPTION OF THE PREFERRED EMBODIMENTS

One embodiment of the lifting apparatus consists of a first rod with an insulated handle on the proximal end and a first hook formed into the distal end. Lateral extensions are attached to the first rod adjoined to the first hook to provide a first stabilization means. Pivoting means are securely attached to the first rod. A shaft running through the pivoting means has parallel stabilizing rods attached to its ends at right angles which straddle the first rod and have affixed between them a second arcuate hook. The parallel stabilizing rods are bent at an angle away from each other to provide a second stabilizing means that contact with the Dutch oven lid when lifting the lid. The first rod is bent at an angle to allow the second hook to pivot and engage the handle of the lid while the stabilizing means attached to the first rod, contacts the cover. The weight of the lid causes a snug contact between the shaft of the pivoting means and the first rod to firmly press against the lid and the first and second stabilizing means.

A second embodiment provides a stabilizing means formed by a closed structure attached at the end of the first rod. The closed structure can be in the form of a triangle or other shape which provides stabilization when in contact with the lid. The closed structure has a hook midway between the points of contact on the main rod member. A connecting rod is attached across the proximal corner of the closed structure. A second member composed of a hook and a stabilizing peg is attached to a pivot midline on the connecting rod. The first rod is bent at an angle to allow the second hook to pivot and engage the handle of the lid while the closed structure attached to the first rod snugly contacts the lid. The weight of the lid provides a snug contact between the stabilizing means attached to the rod and the lid.

A third embodiment provides a stabilizing means attached to the first rod by having members which form a vee shape. The members of the vee are formed into hooks at their distal ends. A second rod extends between the members of the vee forming a triangle. A second hook is attached to a pivot point located midway between the members forming the vee shape on the second rod. The members forming the vee shape are bent at an angle from the first rod. This provides a snug contact between the lid and the stabilizing means when the lid is lifted. The members forming the vee shape are also bent at the distal ends to form hooks.

DETAILED DESCRIPTION OF THE DRAWINGS

The invention herein provides a novel apparatus for removing and lifting tops, lids or covers from apertures such as ends of pipes, pots, manholes and other containers, which is described in relationship to the drawings. An insulated handle 12 forms an angle with main rod 10. Main rod 10 is bent at an angle 31 in the same direction as the handle 12 which allows lateral member 26 to form a snug contact with lid 28 when lifting the lid. Main rod 10 is also bent at the distal end to form a hook 24. A pivot point 16 consists of a pivot means 18 which permits a shaft 20 to rotate therein.

In the preferred embodiment depicted by FIGS. 1, 2, and 3, pivoting means 18 is attached directly to main rod 10 and the proximal ends of lateral members 22 are securely connected to connecting rod 20. This allows rotation of the connecting rod 20 in the pivoting means 18. Hook 14 is securely affixed between lateral members 22 that provides a pivotal support for the hook.

In a second embodiment depicted by FIGS. 4, 5, and 6, the two ends of lateral stabilizing means 33 are rigidly attached to main rod 10 making it a closed structure. Stabilizing means 32 is bent at an angle to facilitate the snug contact between hook 35 and the handle of the Dutch oven lid 28. Connecting rod 20 is firmly attached to both sides of lateral stabilizing means 33 where the lateral stabilizing means 33 forms a bend. Pivot means 18 rotates on connecting rod 20 and is rigidly attached to pivot member 20 and connecting member 34. Hook 35 and stabilizing member 32 are integrally formed into one unit. The unit is rotatable about connecting rod member 20. A hook 37 is rigidly attached to stabilizing member 33 at the base of the essentially triangular section forming the closed structure at essentially the midline of the supporting first rod means 10.

In another embodiment of the invention, as depicted in FIGS. 7, 8, and 9, stabilizing members 30 are firmly attached to rod 10 forming a vee. The distal ends of the stabilizing members 30 are bent at an angle to form hooks 29 that stabilize the lid being lifted. As in the embodiment of FIGS. 4–6, a connecting rod 20 supports a pivot means 18. The pivot means 18 is secured to a second rod bent into a hook 36 for engaging a lid handle that snugly contacts a handle of the Dutch oven lid 28 as the lid is lifted. Stabilizing peg 32 is rigidly attached to the second rod shaft adjacent the hook 36.

In lifting the lid with the embodiment illustrated in FIGS. 1, 2, and 3, hook 14 can engage the handle on the Dutch oven lid while stabilizing means 26 is snugly fitted against the lid 28 allowing the lid to be controllably lifted. When the handle of the Dutch oven is engaged by hook 24, stabilizing members 22 are snugly fitted against the lid 28 thereby allowing the lid to be controllably lifted at an angle from the horizontal plane.

When the embodiment illustrated by FIGS. by 4, 5, and 6 is used in lifting the lid of a Dutch oven, the hook 35 engages the handle of the Dutch oven lid 28 and the stabilizing means 33 contacts the lid snugly and allows the lid to be lifted vertically. When hook 37 engages the handle, stabilizing means 32 snugly fits against the lid of the Dutch oven allowing the lid to be controllably lifted at an angle from the horizontal plane.

When using the embodiment depicted in FIGS. 7, 8, and 9 for lifting the Dutch oven lid, hook 36 engages the handle and stabilizing peg 32 snugly contacts the lid while stabilizing means 30 also contacts the lid providing a 3 point stabilization while lifting the lid.

The Dutch oven as a unit can be lifted by its bail with this device. In the embodiment depicted in FIG. 1, 2, and 3, hook 24 can be used for this purpose. In the embodiment illustrated by FIGS. 4, 5, and 6, the bail can be engaged by hook 37. In FIG. 7 the bail is lifted by hooks means 29.

The lifting tool can be made of any sturdy material which is structurally strong and which maintains its shape and strength when heated. A preferred material is cast iron or heavy steel.

The insulated handle can be made of any material that does not conduct heat readily, for example rubber, wood, fiberglass or foamed plastic.

The descriptions hereinabove are by way of illustration only and are not intended to limit the scope of the invention as set forth in the claims below.

What is claimed is:

1. A lifting device for lifting and manipulating covers with handles which comprises:
    a first rod with a proximal end and a distal end;
    said first rod having a handle on the proximal end;
    said first rod having a cover engaging first stabilizing means formed on said distal end;
    a pivot means formed on said first rod adjacent said distal end;
    a second rod means having a proximal end and a distal end;
    said second rod means proximal end being pivotally attached to said first rod by said first rod pivot means;
    said second rod means having a cover engaging means on said second rod means distal end;
    the first rod having at its distal end a hook means for engaging the cover handle;
    said second rod means is formed by parallel sides joined at said second rod means proximal end by a shaft;
    said second rod means shaft being rotatable in said first rod pivot means;
    said second rod means parallel sides are bent outwardly and away from each other at said second rod means distal end.

2. A lifting device as defined in claim 1 wherein:
    said hook means is formed as a part of said first rod distal end.

3. A lifting device as defined in claim 1 wherein:
    said hook means is formed as a part of said second rod means distal end.

4. A lifting device as defined in claim 1 wherein:
    said first rod distal end has a first section bent outwardly to form an angle between said rod and a second section which bends upwardly to form a hook.

5. A lifting device as defined in claim 1 wherein:
    said first rod distal end stabilizing means is a lateral member extending outwardly in opposite directions from said first rod at essentially right angles at the point where said first rod bends to form a hook.

6. A lifting device as defined in claim 1 wherein:
    said hook means associated with said first rod distal end is securely attached between said second rod means parallel sides.

7. A lifting device as defined in claim 1 wherein:
    said hook means associated with said first rod distal end is securely attached between said second rod means parallel sides.

8. A lifting device as defined in claim 1 wherein:
    said hook means include a first hook and a second hook;
    said first hook is formed at said distal end of said first rod by said first rod distal end being bent outwardly to form a angle between said rod and a second section bent upwardly to form said first hook;
    said second hook is formed by securing a bent rod section between parallel sides forming said second rod mean.

9. A lifting device as defined in claim 8 wherein:
    said second rod means is formed by parallel sides joined at said second means rod proximal end by a shaft;
    said second rod means shaft being rotatable in said first rod pivot means;
    said first rod distal end stabilizing means is a lateral member extending outwardly in opposite directions from said first rod at essentially right angles at the point where said first rod bends to form a hook.

* * * * *